United States Patent
Padwekar

(10) Patent No.: US 7,636,304 B2
(45) Date of Patent: Dec. 22, 2009

(54) SYSTEM AND METHOD FOR PERFORMING DISTRIBUTED POLICING

(75) Inventor: Ketan A. Padwekar, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 611 days.

(21) Appl. No.: 11/093,882

(22) Filed: Mar. 30, 2005

(65) Prior Publication Data

US 2006/0221819 A1   Oct. 5, 2006

(51) Int. Cl.
G01R 31/08 (2006.01)
H04L 12/28 (2006.01)
H04J 3/16 (2006.01)

(52) U.S. Cl. .................. 370/230; 370/235.1; 370/410; 370/468

(58) Field of Classification Search .............. 370/235.1, 370/230, 400, 468, 235, 229, 410
See application file for complete search history.

(56) References Cited

U.S. PATENT DOCUMENTS

| | | | |
|---|---|---|---|
| 5,953,317 A * | 9/1999 | Ogasawara et al. | 370/232 |
| 6,304,551 B1 * | 10/2001 | Ramamurthy et al. | 370/232 |
| 6,356,565 B1 * | 3/2002 | Bouyer et al. | 370/468 |
| 6,363,053 B1 * | 3/2002 | Schuster et al. | 370/230 |
| 6,578,082 B1 * | 6/2003 | Ho et al. | 709/233 |
| 6,801,500 B1 * | 10/2004 | Chandran | 370/230.1 |
| 6,826,150 B1 * | 11/2004 | Bhattacharya et al. | 370/230 |
| 6,829,649 B1 * | 12/2004 | Shorey et al. | 709/235 |
| 6,950,395 B1 * | 9/2005 | Bashandy et al. | 370/230.1 |
| 7,123,583 B2 * | 10/2006 | Hoar et al. | 370/230 |
| 7,272,155 B2 * | 9/2007 | Kenney et al. | 370/469 |
| 2002/0089929 A1 * | 7/2002 | Tallegas et al. | 370/230 |
| 2004/0141462 A1 * | 7/2004 | Mistry et al. | 370/229 |
| 2005/0080918 A1 * | 4/2005 | Wu et al. | 709/233 |
| 2005/0141523 A1 * | 6/2005 | Yeh et al. | 370/400 |
| 2005/0157723 A1 * | 7/2005 | Kim et al. | 370/392 |
| 2005/0174944 A1 * | 8/2005 | Legault et al. | 370/235.1 |

* cited by examiner

Primary Examiner—Kwang B Yao
Assistant Examiner—Candal Elpenord
(74) Attorney, Agent, or Firm—Campbell Stephenson LLP

(57) ABSTRACT

Various systems and methods that synchronize local copies of a variable used in a distributed algorithm, such as that used in distributed policing. For example, one system includes several distributed algorithm participants that are coupled to communicate with each other. Each of the each of the distributed algorithm participants maintains a shared variable in order to implement the distributed algorithm. One of the distributed algorithm participants is a synchronizer. The synchronizer is configured to calculate a new value of the shared variable and to communicate the new value to each of the other distributed algorithm participants. The distributed algorithm can be a distributed policing algorithm, and the shared variable can be a global bucket.

19 Claims, 8 Drawing Sheets

SYSTEM AND METHOD FOR PERFORMING DISTRIBUTED POLICING

FIELD OF THE INVENTION

This invention relates to networking and, more particular, to performing distributed policing within a network.

BACKGROUND OF THE INVENTION

Congestion occurs when network devices are unable to operate as desired due to the presence of too much traffic within the network. Because of congestion, a network device may be overwhelmed with incoming traffic. Consequentially the network device may begin to operate more slowly than desired. Accordingly, congestion degrades a network's performance. Congestion can lead to packet delay or even packet loss.

Quality of Service (abbreviated QoS) is a feature that reduces congestion within a network by implementing selective packet drop. A packet is "dropped" whenever a network device that receives that packet does not forward the packet. QoS involves classifying and policing packets received by each network device. Classifying packets involves differentiating packets by class according to a policy selected by a network administrator. For each class of packets, a policing algorithm is used to perform policing by measuring the incoming traffic in that class and then comparing that measure with policing parameters selected by the network administrator.

Depending on the outcome of the comparison, the policing algorithm identifies each packet as being either "in profile" or "out of profile." "In profile" packets are forwarded normally and are described as "permitted" traffic. "Out of profile" packets are either dropped or "marked" and are described as "policed" traffic. Marked packets are forwarded after being updated to include information identifying that those packets have been marked. Being marked increases the probability that the packet will be dropped when another device applies QoS to the packet.

Typically, policing is performed by a device or software program, referred to as a "policer," that is included within a network device. There can be multiple forwarding engines per network device. In conventional policing, each forwarding engine performs policing independently. Distributed policing algorithms allow several forwarding engines to perform policing in a manner that reflects traffic conditions at all of the participating forwarding engines. Thus, a packet can be policed at one forwarding engine based on aggregate traffic conditions experienced by a group of forwarding engines.

Distributed policing is advantageous in that it allows the same policing policy to be applied to a class of traffic being handled by multiple independent policers. Ideally, if the rate of traffic received at each of the distributed policers is the same, each of the distributed policers should permit the same amount of traffic. However, due to various factors, this ideal state of operation may not be achieved.

Various factors can result in traffic being policed unfairly by one of the policers that is performing distributed policing. For example, each policer may send packets to the other distributed policers in order to inform the other policers of local traffic conditions. Based on these update packets, the policers can determine how much total traffic has been permitted by the group of distributed policers. However, if some of the distributed policers do not receive a particular update packet (e.g., due to packet loss within the network), different policers will maintain different total counts of permitted traffic. As a result, some policers may permit more traffic than those policers should permit, while other policers may permit less traffic. As this example shows, improved techniques for implementing distributed policing are desirable.

BRIEF DESCRIPTION OF THE DRAWINGS

A more complete understanding of the present invention may be acquired by referring to the following description and the accompanying drawings, in which like reference numbers indicate like features.

Figure 1:
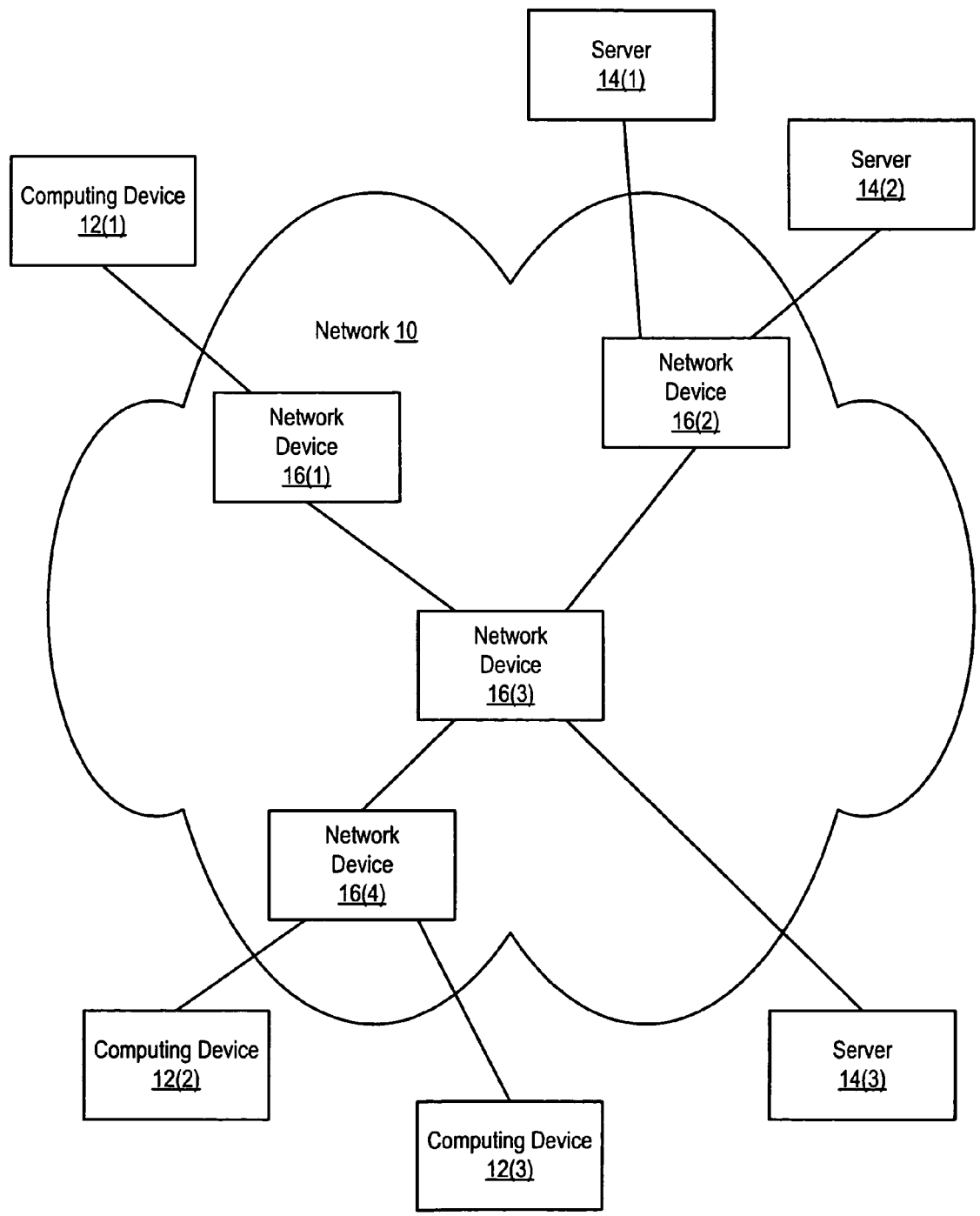
FIG. 1 is a block diagram of a network, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Various systems and methods that synchronize local copies of a variable used in a distributed algorithm, such as that used in distributed policing, are disclosed. For example, one system includes several distributed algorithm participants that are coupled to communicate with each other. Each of the distributed algorithm participants maintains a shared variable in order to implement the distributed algorithm. One of the distributed algorithm participants is a synchronizer. The synchronizer is configured to calculate a new value of the shared variable and to communicate the new value to each of the other distributed algorithm participants. The distributed algorithm can be a distributed policing algorithm, and the shared variable can be a global bucket. By providing the new value of the shared variable to all of the participants, discrepancies between local copies of the shared variable are eliminated.

FIG. 1 is a block diagram of a network 10. Network 10 couples several computing devices 12(1), 12(2), and 12(3) and servers 14(1), 14(2), and 14(3). Network 10 includes network devices 16(1), 16(2), 16(3), and 16(4). Computing devices 12(1)-12(3) are examples of devices such as hosts, personal computers, personal digital assistants, cell phones, printers, and the like, which use network 10 to communicate with each other and with servers 14(1)-14(3). Servers 14(1)-14(3) are examples of devices that store information for and/or provide various services to computing devices 12(1)-12(3). Servers can be implemented on computing devices such as personal computing systems, multiprocessor computing systems, and the like. It is noted that the configuration of network 10 and the configuration and number of devices coupled by network 10 is provided as an example. Other embodiments can include different numbers of networks, computing devices, servers, and network devices. Furthermore, other embodiments can implement different network configurations.

Network devices 16(1)-16(4) are examples of devices such as routers, bridges, gateways, switches, and the like, which operate to communicate packets within network 10. Computing devices 12(1)-12(3), servers 14(1)-14(3) and network devices 16(1)-16(4) are interconnected by logical and/or physical links. For example, in one embodiment, network device 16(2) is coupled to network device 16(3) by a physical Ethernet link, while network device 16(3) is coupled to network device 16(1) by a logical tunnel.

Figure 2:
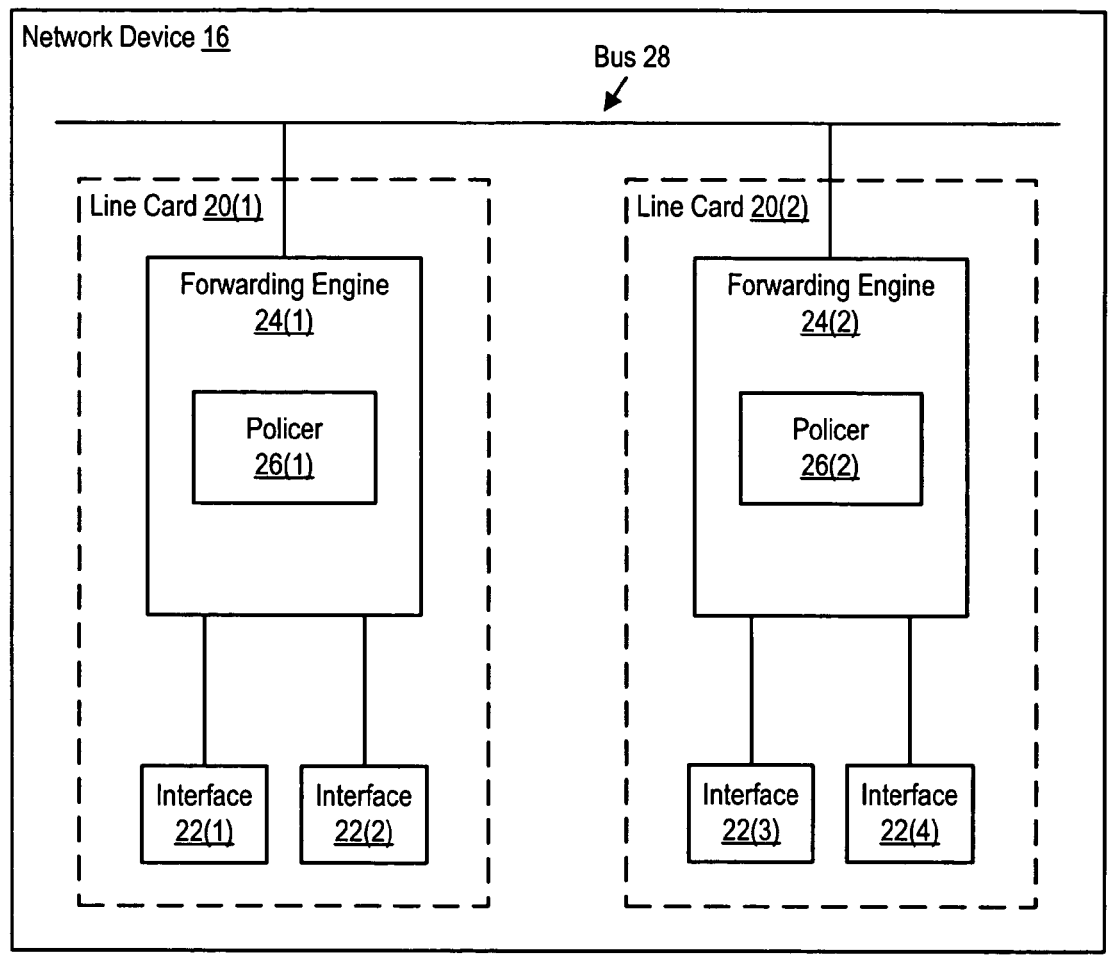
FIG. 2 is a block diagram of a network device that includes two policers that are cooperating to implement distributed policing, according to one embodiment of the present invention.

FIG. 2 is a block diagram of a network device that includes two policers that are cooperating to implement distributed policing. As shown in FIG. 2, a network device 16 (e.g., one of network devices 16(1)-16(4) of FIG. 1) includes several line cards, such as line cards 20(1) and 20(2). Each line card includes several interfaces, as well as a forwarding engine. For example, line card 20(1) includes interfaces 22(1) and 22(2) as well as forwarding engine 24(1). Line card 20(2) similarly includes interfaces 22(3) and 22(4) as well as forwarding engine 24(2). Each interface is connected to a network link that connects to a device such as another network device, a server, a personal computer, or the like.

Each forwarding engine 24(1) and 24(2) performs switching and/or routing functions. For example, each forwarding engine can perform Layer 2 (L2) switching based on Ethernet headers included in each packet. Packets can be forwarded to different line cards via bus 28 (or any other suitable interconnect, such as a switching fabric). For example, if forwarding engine 24(1) determines that a packet received via interface 22(1) should be output via interface 22(4), forwarding engine 24(1) can cause the packet to be conveyed from line card 20(1) to line card 20(2) via bus 28.

Each forwarding engine 24(1) and 24(2) also implements a policer. As shown, forwarding engine 24(1) includes policer 26(1) and forwarding engine 24(2) includes policer 26(2). Policer 26(1) polices packets received via interfaces 22(1) and 22(2), while policer 26(2) polices packets received via interfaces 22(3) and 22(4). Each policer 26(1)-26(2) can be configured, for each designated class of traffic, to either operate independently or to cooperate with one or more other policers in order to perform distributed policing. Distributed policing can be performed by policers on the same line card, within the same network device but on different line cards, and/or within different network devices. In some embodiments, policers 26(1) and 26(2) are configured to perform either independent or distributed policing by updating configuration information associated with each policer to identify the type of policing to be performed. For example, each policer can be selectively configured, by writing a value to a configuration register associated with that policer, to perform distributed policing, non-distributed policing, or no policing for each traffic class.

When policers 26(1) and 26(2) are configured to use a distributed policing algorithm, policers 26(1) and 26(2) apply a distributed policing algorithm to incoming packets in order to determine whether to police each packet. Packets that are dropped or marked are considered to have been policed; packets that are permitted without being marked are not considered to have been policed. There are several different distributed policing algorithms that can be used, including leaky bucket algorithms and token bucket algorithms.

In this example, each policer 26(1) and 26(2) uses a leaky bucket algorithm to perform distributed policing for packets received via one or more respective interfaces. In the leaky bucket algorithm, a user specifies the allowable rate of traffic that can be permitted. This rate is referred to as the contract rate. This contract rate (possibly in conjunction with other rates, such as a user-specified burst, as described below) defines a bucket, which is a logical construct used to track how much traffic has already been permitted (and thus how much additional traffic can be permitted within a given period). Initially, the bucket is empty (e.g., as reflected by setting the variable that represents the bucket to zero). As packets are permitted, the bucket begins to fill up. Typically, this is reflected by adding the amount of information in each permitted packet to the amount of information already in the bucket. When the bucket is full (e.g., when the variable representing the bucket has reached and/or exceeded a maximum value), packets are policed (e.g., marked or dropped) instead of being permitted.

A leak rate is also specified for use with the leaky bucket algorithm. The leak rate indicates how much information is allowed to be subtracted from the bucket for a given amount of time. The leak rate provides a mechanism for emptying the bucket. As packets are permitted, the bucket fills up. As time elapses, the bucket empties according to the leak rate. Thus, a new bucket value can be calculated by subtracting the product of the leak rate and the amount of time that has elapsed since the last bucket update and then adding the amount of permitted traffic to the existing bucket value.

In distributed policing, each of the participating policers logically shares the same bucket (e.g., by maintaining a local copy of a global bucket value). The bucket that is shared by the participating policers is referred to as a global bucket. Thus, in FIG. 2, if policers 26(1) and 26(2) perform distributed policing for a particular traffic class, both policers 26(1) and 26(2) will (at least under ideal conditions) use the same global bucket value to determine whether to police or permit traffic within that traffic class. In order to perform distributed policing, each policer needs to keep track of how much traffic has been permitted locally. The global bucket is then regularly updated, based on local traffic at the individual policers. For example, if policer 26(2) permits 256 bytes of traffic, the global bucket should be increased by 256 bytes at both policer 26(1) and policer 26(2) (it is noted that the global bucket will also be updated to account for the leak rate).

Thus, in distributed policing, the global bucket indicates how much global traffic has been permitted. The global traffic is the amount of traffic that has been permitted by all of the policers that are involved in performing distributed policing for a particular traffic class. The measure of global traffic is regularly updated based on reports of locally permitted traffic that are provided by each of the individual policers.

When a policer, such as policers 26(1)-26(2), is configured to perform distributed policing, the policer is configured as either a synchronizer or a non-synchronizer policer for purposes of distributed policing. Each policer, synchronizer and non-synchronizer, tracks how much traffic is permitted locally. The regular (non-synchronizer) policers then send local update packets to the synchronizer policer to identify how much traffic has been permitted locally since the sending policer last sent a local update packet. In response to local update packets, the synchronizer policer recalculates the global bucket value, and sends the new global bucket value to all of the other policers.

The local update packets can be sent via interfaces 22(1)-22(4) (e.g., to a synchronizer policer in another network device that is participating in distributed policing). Alternatively, the local update packets can be sent via bus 28 (e.g., to a synchronizer policer in the same network device) instead of and/or in addition to via the network.

In one embodiment, a policer can send a local update packet each time that the policer permits a packet; however, doing so increases the amount of traffic that has to be handled, leading to decreased performance. In another embodiment, a policer can send local update packets using time-based constraints. For example, local update packets can be sent periodically. However, if the policer permits a small amount of traffic each period, sending local update packets periodically may be inefficient and lead to increased network congestion. Accordingly, in some embodiments, policers are configured to send local update packets based on other criteria (e.g., such as total local permitted traffic, receipt of a global update packet (described below) and so on) in addition to and/or instead of time-based criteria. Criteria for sending local update packets can be selected to balance the desire to minimize extra traffic due to sending local update packets with the desire to minimize the policing error at each of the policers.

Thus, as noted above, local update packets can be generated and transmitted in response to a variety of different conditions. For example, each policer can periodically generate and transmit a local update packet that indicates the amount of local traffic permitted by that policer in the previous period. Alternatively, local update packets can be generated and transmitted in response to local traffic conditions at each policer. For example, whenever the measure of locally-permitted traffic exceeds a threshold amount, a policer can generate and send a local update packet. Other techniques for controlling when policers generate and send local update packets can also be used instead of and/or in addition to those described above.

As described above, the synchronizer policer performs the calculation that updates the global bucket and distributes the new global bucket value to all of the policers. This is contrasted with situations in which a designated policer simply sends a value (e.g., an offset representing the total traffic permitted by the policers since the last global bucket update time) to the other policers, and each of the other policers then independently performs the calculation necessary to obtain the new global bucket value. In the latter situations, if the policers had different values of the global bucket before receiving the offset, the policers are likely to still have different global bucket values after obtaining the offset, since the result of each independent calculation will depend on the local value of global bucket.

The synchronizer policer can distribute the new global bucket value by sending a global update packet, which includes the new global bucket value, to all of the policers that are performing distributed policing for that traffic class. Having the synchronizer policer distribute the new global bucket value ensures that the global bucket value will, on average, be the same across all of the policers. In particular, since the synchronizer policer calculates and distributes a new global bucket value, all policers that receive the new global bucket value from the policer will update their local copies of the global bucket to have the same value. Accordingly, the global bucket value is synchronized for all of the policers that receive the new global bucket value, regardless of whether the policers were using the same global bucket value prior to receiving the new global bucket value. If instead the synchronizer simply distributed an offset, and the other policers then independently calculated new global bucket values based on the offset, the policers might still be using different global bucket values after receiving the offset. For example, if the policers initially have different global bucket values (e.g., due to a packet containing a prior offset reaching some, but not all, of the policers), and the policers then update the different global bucket values based on the received offset, the policers will still have different global bucket values after independently updating their global bucket values.

If a global update packet is lost, or if a global update packet is received by some but not all of the policers, the global bucket values at different policers may no longer be the same. However, the global bucket values will be automatically resynchronized the next time a global update packet is sent. Resynchronization is also automatically provided if a local update packet is lost. For example, if a local update packet sent by one policer is lost, the synchronizer will not include the traffic permitted by that policer in the new global bucket value. Before the new global bucket value is sent by the synchronizer, the policer whose local update packet was lost may have a significantly different global bucket value than the other policers. Once the new global bucket value is provided to all policers, however, all of the policers will again use the same global bucket value. While loss of the local update packet may lead to a transient error in operation (e.g., the distributed policers may allow slightly more traffic than permitted by the contract rate for a short time after then local update packet is lost), resynchronizing the global bucket values at all of the policers will prevent this error from persisting.

As the above examples show, by designating one policer as a synchronizer policer and having that synchronizer policer routinely (e.g., in a routine manner, whether periodically or in response to certain predesignated stimuli) calculate and distribute a new global bucket value, any errors that arise due to variations between local copies of the global bucket at different policers can be corrected. For example, one policer may have a global bucket value that differs from the other policer's global bucket value by a significant amount. After the synchronizer policer provides a new global bucket value to all of the policers, however, the error will be corrected, since the out-of-sync policer will have the same global bucket value as each other policer. Since the sychronizer policer routinely distributes the new global bucket value, error correction occurs automatically during the normal course of operation of the distributed policing system. Accordingly, no special error handling functionality is required to correct discrepancies between different policers' copies of the global bucket. For example, no special software is needed to resynchronize the different copies of the global bucket. By implementing error correction into the normal operation of a distributed policing system, the need for specialized and time-consuming error correction routines is reduced.

Additionally, if a new policer is added to a group of policers that is already performing distributed policing for a traffic class, that new policer can automatically begin participating in the distributed policing as soon as the synchronizer policer sends a new global bucket value. At that time, the new policer will receive the same global bucket value as all of the other policers. Accordingly, the new policer can begin performing distributed policing without the need to perform any special configuration. Furthermore, the other policers, which are already performing distributed policing when the new policer joins, do not need to be reset. Accordingly, a new policer can join a group of policers without disrupting the operation of the other policers.

Figure 3:
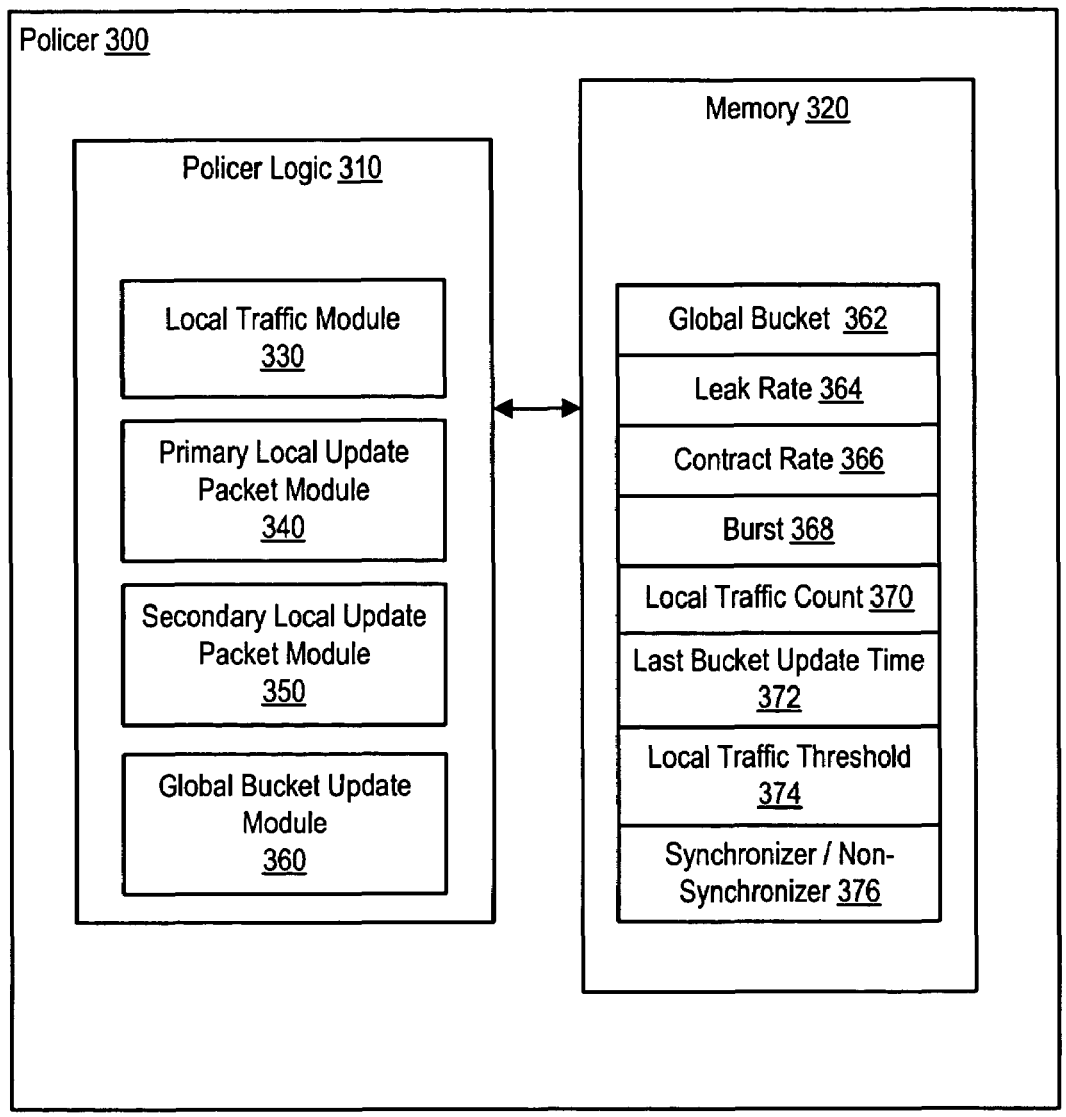
FIG. 3 is a block diagram of a policer, according to one embodiment of the present invention.

FIG. 3 illustrates more details of one embodiment of a policer 300. As shown, policer 300 includes policer logic 310 and a memory 320. Policer logic 310 includes local traffic module 330, primary local update packet module 340, secondary local update packet module 350, and global bucket update module 360. Memory 320 stores various variables used by policer logic 310, including a global bucket variable 362, a leak rate parameter 364, a contract rate parameter 366, a burst parameter 368, a local traffic count 370, a last bucket update time variable 372, a local traffic threshold 374, and a synchronizer/non-synchronizer indication 376. It is noted that the variables shown in memory 320 are used for one traffic class; if more than one class of traffic is policed by policer 300, several sets of such variables (one set per traffic class) can be maintained. Additionally, other variables can be maintained instead of and/or in addition to those shown in FIG. 3. Finally, it is noted that a given policer can function as a non-synchronizer policer for one class of traffic and a synchronizer policer for another class of traffic.

While FIG. 3 shows one particular configuration of a policer, it is noted that other embodiments can include policers with significantly different configurations. For example, in other embodiments, a policer can be implemented in software. Similarly, the functionality represented by each of the modules (local traffic module 330, primary local update packet module 340, and secondary local update packet module 350) can be combined into fewer modules and/or separated into additional modules.

As shown in FIG. 3, policer 300 can store several global pre-configured parameters, including leak rate 364, contract rate 366, and burst 368. Policer 300 can also store global variables such as global bucket 362, as well as several local variables, including local traffic count 370, last bucket update time 372, local traffic threshold 374, and synchronizer/non-synchronizer indication 376. The global variables such as global bucket 362 are variables that should (at least under ideal, non-transitory conditions) have the same value at all of the policers participating in distributed policing for the traffic class.

Contract rate 366 specifies an amount of information per unit time (e.g., 100 Mb/sec). Under normal, non-bursty traffic conditions, the amount of permitted traffic per unit time is controlled so as not to exceed contract rate 366. The value of contract rate 366 is provided by a user. The same contract rate 366 is used by each policer that performs distributed policing for the same traffic class.

Burst 368 specifies the maximum information that can be permitted in excess of contract rate 366 in a given unit of time. By specifying a non-zero burst, a user allows bursty traffic to be permitted, even if doing so temporarily exceeds contract rate 366.

As mentioned above, leak rate 364 specifies how much information is removed from the global bucket per unit time. Global bucket 362 represents the total amount of permitted traffic minus the product of the leak rate and the elapsed time since the last bucket update. Contract rate 366, burst 368, and leak rate 364 apply globally to all policers participating in distributed policing for a particular traffic class.

Local traffic count 370 variable tracks the traffic permitted by policer 300. Each policer maintains its own local traffic count 370. Last bucket update time 372 indicates the time at which global bucket 362 was most recently updated. Local traffic threshold 374 specifies the amount of traffic that can be permitted locally before policer 300 sends a local update packet. Other variables (not shown) can be used to track, for example, the current time and/or the time elapsed since the most recent bucket update.

Synchronizer/non-synchronizer indication 376 is a user-specified variable that identifies whether policer 300 is a synchronizer policer for a particular class. In one alternative embodiment, synchronizer/non-synchronizer indication 376 is implemented as a single bit in a configuration status register.

A packet that is monitored and regulated by an individual policer is as a local packet with respect to that individual policer. Whenever a policer handles a local packet, the policer identifies the amount of information included in the packet (e.g., by determining the packet's size) as well as the traffic class to which the packet belongs. If the identified traffic class is one of the classes that the policer is currently configured to police, the policer will then apply the appropriate policing algorithm (selected based on traffic class) to the packet.

Local traffic module 330 performs the functions that keep track of locally permitted traffic as well as the functions that police local traffic. Thus, in response to a new packet being received at an interface for which policer 300 performs policing, local traffic module 330 can determine whether to police or permit the packet. As noted above, this can involve identifying the class of traffic to which the packet belongs as well as identifying the size of the packet. If the packet belongs to the traffic class being policed, local traffic module 330 determines whether to police the packet, based on the current value of the global bucket, as well as the leak rate and the burst, for the traffic class.

Additionally, in response to permitting a packet, local traffic module 330 can update the measure of locally permitted packets, local traffic count 370. Local traffic count 370 tracks the amount of data that has been permitted locally. The value of local traffic count 370 indicates the number of units of data (e.g., bits, bytes, packets (if packets have constant size), or the like) that have been permitted since the last time a local update packet was sent by policer 300. Local traffic module 330 is responsible for increasing the value of local traffic count 370 each time a packet is permitted. In one embodiment, local traffic module 330 uses the following algorithm to determine whether to police the packet and to update local traffic count 370, where elapsed time is the amount of time that has passed since the global bucket was last updated and packet length is the length of the packet being permitted or policed:

```
If (global bucket + local traffic count − (leak rate * elapsed time) > burst)
    police packet ( );
else
    {
    permit packet ( );
    local traffic count += packet length;
    }
```

Primary local update packet module 340 is configured to send primary local update packets. In this example, primary local update packet module 340 generates and sends a local update packet in response to the value of local traffic count 370 exceeding the value of local traffic threshold 374. However, in other embodiments, primary local update packet module 340 uses other criteria (such as the amount of time that has elapsed since the last primary local update packet was sent) to determine when to generate and send a primary local update packet. In one embodiment, the primary local update packet module 340 uses the following algorithm to determine whether to generate and send a local update packet (referred to as LocalUpdatePacket in the psuedocode below):

```
If (local traffic count > local traffic threshold)
{
    global bucket -= leak rate * elapsed time ;
    if (global bucket < 0 ) global bucket = 0;
    global bucket += local traffic count;
    last bucket update time = current time;
    // Send local traffic count to synchronizer
    LocalUpdatePacket.data = local traffic count;
    transmit LocalUpdatePacket( );
    local traffic count = 0;
}
```

In this example, the policer updates the global bucket value before sending the primary local update packet. The policer updates the global bucket value again in response to receiving a global update packet from the synchronizer policer.

Each primary local update packet includes the current measure of local traffic permitted by policer 300, as represented by the value of local traffic count 370 in this example. Each primary local update packet can also include information identifying policer 300, information identifying the time at which the primary local update packet was generated or sent, information identifying the traffic class to which the current measure of local traffic corresponds, and the like. Primary local update packet module 340 sends each primary local update packet to the synchronizer policer for the traffic class.

Global bucket update module 360 is configured to update the value of global bucket 362 in response to receipt of a global update packet from the synchronizer policer for the traffic class. Each time that policer 300 receives a global update packet that specifies the traffic class, global bucket update module 360 updates global bucket 362 to have the new value provided in the global update packet. When global bucket update module 360 updates the value of global bucket 362, global bucket update module 360 can also update one or more other variables (not shown). For example, global bucket update module 360 can reset a counter used to track the amount of time that has elapsed since the most recent global bucket update (e.g., such a counter can be used when applying the leak rate to the global bucket).

Secondary local update packet module 350 is an optional (at least in some embodiments) module that is configured to generate and send secondary local update packets. Secondary local update packets are generated and sent in response to reception of a global update packet by policer 300. Each time that policer 300 receives a global update packet from the synchronizer policer, secondary local update packet module 350 determines whether to send a secondary local update packet to the synchronizer policer. In some embodiments, this determination may be trivial, and secondary local update packet module 350 simply generates and sends a secondary local update packet each time that a global update packet is received.

In other embodiments, secondary local update packet module 350 selectively determines whether to generate and send a secondary local update packet each time a global update packet is received. For example, secondary local update packet module 350 can determine whether to generate and send a secondary local update packet based on whether the value of local traffic count 370 exceeds a threshold (e.g., one threshold can be used to determine when to send primary local update packets and another threshold can be used to determine when to send secondary local update packets). The determination as to whether to generate and send a secondary local update packet can be based on considerations that are similar to those used to determine whether to generate and send a primary local update packet (although as noted above, a secondary local update packet differs in that it is sent in response to receipt of a global update packet). In one embodiment, in response to detecting receipt of a global update packet, secondary local update packet module 350 uses the following algorithm to determine whether an "effective bucket" (global bucket+local traffic count−(leak rate*elapsed time)) exceeds the burst. If so, secondary local update packet module 350 sends a secondary local update packet.

```
last global bucket update time = current time;
// Secondary local update packet trigger check
if (local traffic count > 0) && (global bucket + local traffic count -
(leak rate * elapsed time) > burst)
{
    LocalUpdatePacket.data = local traffic count;
    transmit LocalUpdatePacket( );
    global bucket = GlobalUpdatePacket.data + local traffic count;
    local traffic count = 0;
}
else
{
    bucket = GlobalUpdatePacket.data;
}
```

As with the example algorithm for sending primary local update packets, in the above algorithm for sending secondary local update packets, the policer updates the global bucket value prior to sending the local update packet. The policer will update the global bucket value again in response to receiving a global update packet from the synchronizer policer.

The content and format of a secondary local update packet can be similar (or even identical) to that of a primary local update packet. Like primary update packets, secondary local update packets are sent to the synchronizer policer in order to identify the amount of local traffic that has been permitted by policer 300 in a particular traffic class. It is noted that in some embodiments, however, only primary local update packets are sent.

It is noted that, in some embodiments, each policer can perform policing for multiple classes of traffic at substantially the same time. Accordingly, each policer can include several sets (one per class of traffic being policed) of the above-described modules. Alternatively, each module can be configured to handle multiple different classes of traffic. As yet another alternative, some functionality can be aggregated for multiple different classes of traffic (e.g., the same module and/or subset of variables, used to perform that functionality, can be used to police more than one class), while other functionality is separated for each different class (e.g., a different instance of a module and/or subset of variables, used to perform that functionality, is used for each different class being policed).

The use of secondary local update packets can reduce the likelihood that deadlock conditions will arise at one of the policers involved in performing distributed policing. Deadlock can arise if the global buckets at each of the policers are out of sync due to skew between the local clocks (used for policing calculations) at each the policers.

For example, assume there are two policers, B and C, that perform distributed policing for a traffic class. The amount of locally permitted traffic at policers B and C can be relatively even and near the local threshold for sending a primary local update packet. When policer B receives the next packet, policer B permits the packet. Permitting the packet causes policer B's local traffic count to exceed the local traffic threshold, so policer B sends a local update packet, which in turn causes the synchronizer policer to recalculate the global bucket value and distribute the updated global bucket value to all of the policers. Because of the updated global bucket value, policer C will not be able to permit additional packets until enough time has passed for the leak rate to reduce the global bucket. If the clock skew between policers B and C is such that policer B's clock is ahead of policer C's clock, policer B will see a lower effective global bucket (after applying the leak rate) than policer C. Accordingly, policer B will be able to permit a packet earlier than policer C. This then allows policer B to permit one or more local update packets before policer C, which can in turn lead to policer B once again sending a local update packet before policer C is able to permit an additional packet. Thus, policer C is effectively caught in a situation in which policer C is unable to permit any more traffic, and consequentially is unable to send a local update packet. This creates a bias against traffic received by policer C, since policer C is policying more than its fair share of traffic.

Accordingly, due to clock skew and traffic patterns, policer C may be effectively deadlocked, and policer B may use more than its share of the distributed bandwidth. The deadlock condition happens because the local traffic count on policer C stays just below the local traffic threshold, and due to the clock skew, policer C is not able to permit an additional packet, which would increment the local traffic count and trigger a local update packet. In this situation, the effective bucket at policer C is kept at a value that exceeds the burst, which prevents policer C from permitting local traffic.

By implementing secondary local update packets, the above-described deadlock situation can be resolved. For example, when the global bucket value is updated based on policer B's local update packet, a global update packet will be sent to all of the policers, including policer C. Receipt of the global update packet can then trigger policer C to send a local update packet. As noted above, policer C's is deadlocked when policer C's effective bucket exceeds the burst. Accordingly, policer C can trigger a secondary local update packet in response to (1) receiving a global update packet and (2) determining that the effective bucket exceeds the burst. After policer C sends a secondary local update packet, the global bucket value can be updated based on the local traffic permitted by policer C and redistributed to all of the policers. Since policer B will now be performing policing based on a global bucket value that takes the traffic permitted by policer C into account, a more fair policing distribution can be achieved.

This example illustrates how the use of secondary local update packets can reduce or avoid deadlock in situations in which primary local update packets are sent in response to data-quantity-based criteria. Secondary local update packets can also be used to reduce or avoid deadlock in situations in which primary local update packets are sent in response to time-based criteria. For example, a distributed policing system can include policers that each periodically send primary local update packets based on a local timer. The policers reset their local timers in response to predesignated conditions (e.g., such as receiving a global update packet). In this situation, network conditions can lead to one policer resetting its local timer before a full period has elapsed on the timer, preventing the policer from being able to send a local update packet. If this condition persists, the policer may begin policing traffic unfairly, relative to the other policers. If the policer can send a secondary local update packet in response to receiving a global update packet, however, this unfairness can be prevented.

While FIG. 3 shows an example of a policer that sends local update packets (primary and/or secondary) only to a synchronizer policer, it is noted that other embodiments can operate differently. For example, in some embodiments, the synchronizer policer does not distribute a new value of the global bucket each time that the synchronizer policer receives a new local update packet. Instead, the synchronizer policer distributes a new value of the global bucket periodically and/or in response to receiving a certain number N of local update packets. If N is greater than one, policers can provide local update packets to all policers, and each policer can independently recalculate its local copy of the global bucket in response to each local update packet. During the periods when the synchronizer policer is recalculating the global bucket and distributing the recalculated global bucket, the other policers can send local update packets only to the synchronizer policer (as opposed to sending local update packets to all other policers). Having N greater than one may lead to temporary discrepancies between different copies of the global bucket (e.g., if a local update packet is lost); however, these discrepancies will be eliminated the next time that the synchronizer distributes a new global bucket to all of the policers.

In the example of FIG. 3, the policer includes a specific set of modules that perform specific functions. It is noted that in alternative embodiments, policers can include different modules, and/or the modules can implement other functions instead of and/or in addition to those described above. Furthermore, the functionality performed by a policer can be subdivided into modules differently or not subdivided at all. Additionally, some modules can be implemented in hardware while other modules are implemented in software, or all modules can be implemented in either hardware or software. Furthermore, while the example of FIG. 3 shows various variables being stored in memory, it is noted that in alternative embodiments, such variables can be stored in hardware registers or other storage devices.

Figure 4:
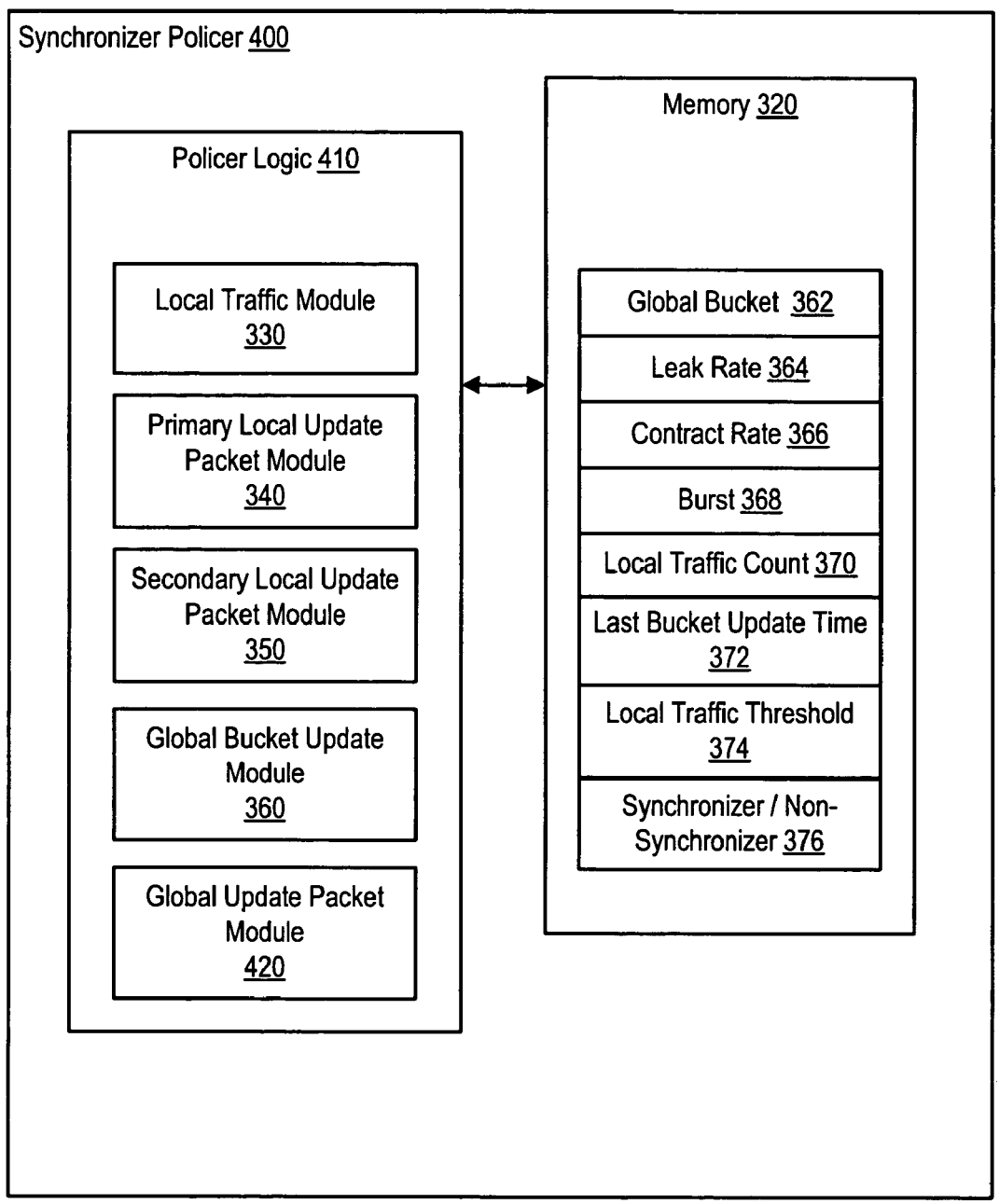
FIG. 4 is a block diagram of a synchronizer policer, according to one embodiment of the present invention.

FIG. 4 is a block diagram of a synchronizer policer 400. Synchronizer policer 400 includes many of the same modules and variables as policer 300. In fact, synchronizer policer 400 includes the same functionality as policer 300, as well as additional functionality needed to operate as a synchronizer policer. It is noted that this additional functionality may be present but disabled (e.g., in response to the value of synchronizer/non-synchronizer indication 376) in non-synchronizer policers. While FIG. 4 illustrates a synchronizer policer that also participates in distributed policing, it is noted that alternative embodiments can implement a synchronizer policer that performs only synchronization functions (instead of also performing distributed policing). For example, in one embodiment, policers that actually perform distributed policing are implemented in hardware, while a dedicated "virtual" policer, implemented in software, acts as the synchronizer policer but does not actually police any traffic.

Like policer 300 of FIG. 3, synchronizer policer 400 includes a memory 320 (or other storage) for variables such as global bucket 362, leak rate 364, contract rate 366, burst 368, local traffic count 370, last bucket update time 372, local traffic threshold 374, and synchronizer/non-synchronizer indication 376. Here, synchronizer/non-synchronizer indication 376 will have a value that identifies that policer 400 is a synchronizer policer.

Synchronizer policer 400 also includes policer logic 410, which is coupled to access memory 320. Like policer logic 310 of FIG. 3, policer logic 410 includes local traffic module 330, primary local update packet module 340, secondary local update packet module 350, and global bucket update module 360. Local traffic module 330, primary local update packet module 340, secondary local update packet module 350, and global bucket update module 360 function similarly to the similarly numbered modules shown in FIG. 3.

Policer logic 410 also includes a global update packet module 420, which performs the functions that are specific to a synchronizer policer. Global update packet module 420 is configured to receive local update packets (primary or secondary). In response to receiving one or more local update packets, global update packet module 420 calculates a new global bucket value. Global update packet module 420 then sends a global update packet, which includes the new global bucket value, to each policer participating in distributed policing, which causes a global bucket update module 360 within each policer to update a local copy of the global bucket value.

Global update packet module 420 detects whenever synchronizer policer 400 has received a local update packet, whether from another policer or from a module (e.g., primary local update packet module 340 or secondary local update packet module 350 of FIG. 4) internal to synchronizer policer 400. In response to detecting such a local update packet, global update packet module 420 extracts the local traffic count contained in the local update packet. Global update packet module 420 updates the global bucket to account for the leak rate and then sums the extracted local traffic count obtained from the local update packet with the current value of global bucket 362.

Once global update packet module 420 has summed the extracted local traffic count with the current value of global bucket 362, global update packet module 420 generates a global update packet. Global update packet module 420 inserts the sum into the global update packet, and sends to global bucket update packet to the all of the policers that perform distributed policing. Global bucket update modules in each of the policers (including the synchronizer policer, in at least some embodiments) can then update local copies of global bucket 362 in response to the global update packet. Thus, in this example, global update packet module 420 sends a global update packet in response to each local update packet received by synchronizer policer 400. It is noted that in alternative embodiments, global update packet module 420 sends global update packets periodically and/or in response to receiving a certain number N of local update packets, where N is greater than one.

In one embodiment, global update packet module 420 uses the following algorithm to calculate the new value and send the global update packet (in this example, global update packet module 420 also updates the global bucket value):

```
global bucket -= leak rate * elapsed time;
if (global bucket < 0) global bucket = 0;
global bucket += LocalUpdatePacket.data;
last bucket update time = current time;
// Send bucket update to other policers
GlobalUpdatePacket.data = global bucket;
transmit GlobalUpdatePacket( ).
```

In an alternative embodiments, the synchronizer can also add its local byte count to the global bucket value before sending the global update packet. This can reduce traffic (e.g., by reducing the likelihood that a global update packet will be generated as the result of a local update packet generated by the synchronizer policer).

In the above example, the synchronizer policer includes a specific set of modules that perform specific functions. It is noted that in alternative embodiments, synchronizer policers can include different modules, and/or the modules can implement other functions instead of and/or in addition to those described above. Furthermore, the functionality performed by a synchronizer policer can be subdivided differently. For example, in one embodiment, the functionality of global bucket update module 360 and global update packet module 420 can be combined within a synchronizer policer. Additionally, some modules can be implemented in hardware while other modules are implemented in software, or all modules can be implemented in either hardware or software. Furthermore, while the example of FIG. 4 shows various variables being stored in memory, it is noted that in alternative embodiments, such variables can be stored in hardware registers or other storage devices.

Figure 5:
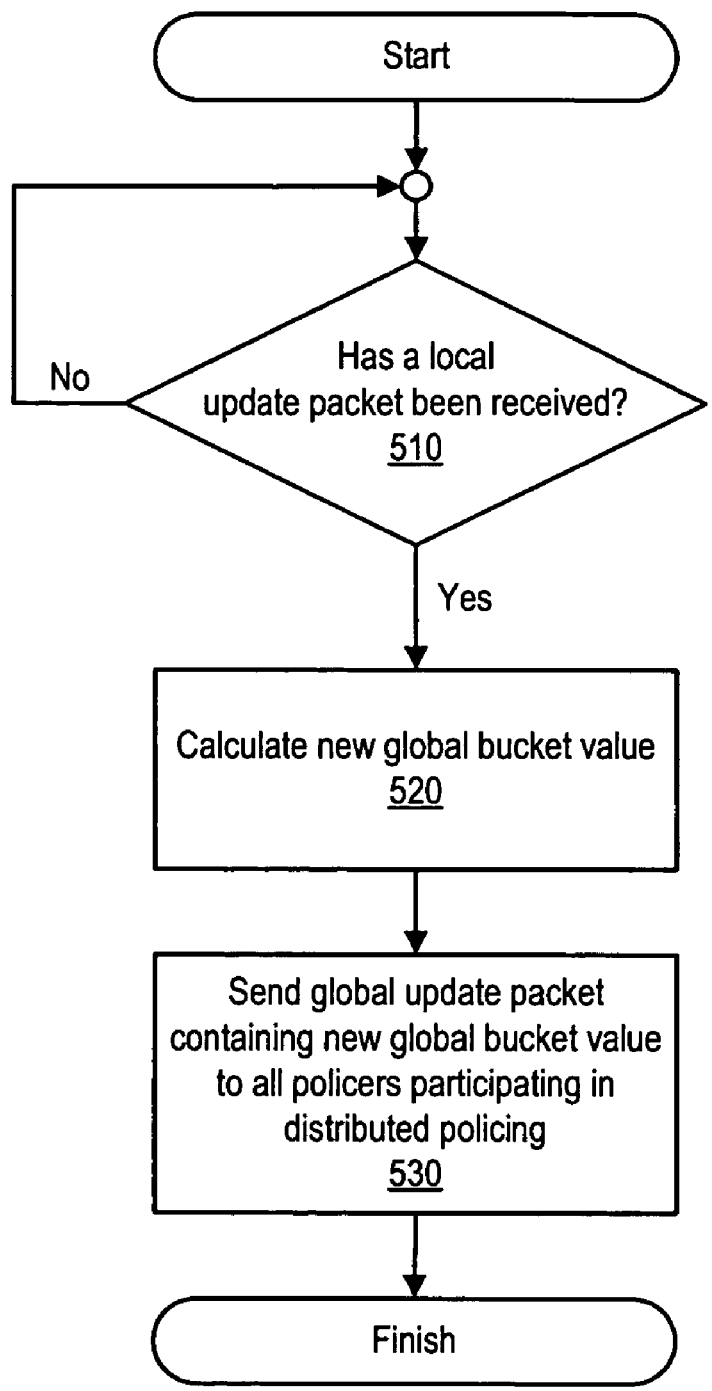
FIG. 5 is a flowchart of a method performed by a synchronizer policer, according to one embodiment of the present invention.

FIG. 5 is a flowchart of a method performed by a synchronizer policer. The synchronizer policer waits to receive a local update packet, which is either generated internally to the synchronizer policer or received from another policer. If a local update packet is received, as detected at 5 10, the synchronizer policer calculates a new global bucket value, as shown at 520. Calculation of the new global bucket value involves accounting for the leak rate and then adding a value, obtained from the local update packet, to the current global bucket value to get a new global bucket value. The value that is obtained from the local update packet indicates an amount of traffic that has been permitted by the policer that sent the local update packet.

After calculating a new global bucket value, the synchronizer policer sends a global update packet to all of the policers that are participating in distributed policing, as shown at 530. The global update packet includes the new global bucket value calculated at 520. The policers can then use the new global bucket value to perform distributed policing.

It is noted that the method of FIG. 5 can be repeated. Additionally, other embodiments can include other functions instead of and/or in addition to those shown in FIG. 5. Furthermore, in some embodiments, the synchronizer policer may wait to recalculate and/or redistribute a new global update packet until several local update packets have been received and/or a certain amount of time has elapsed since the last global update packet.

Figure 6:
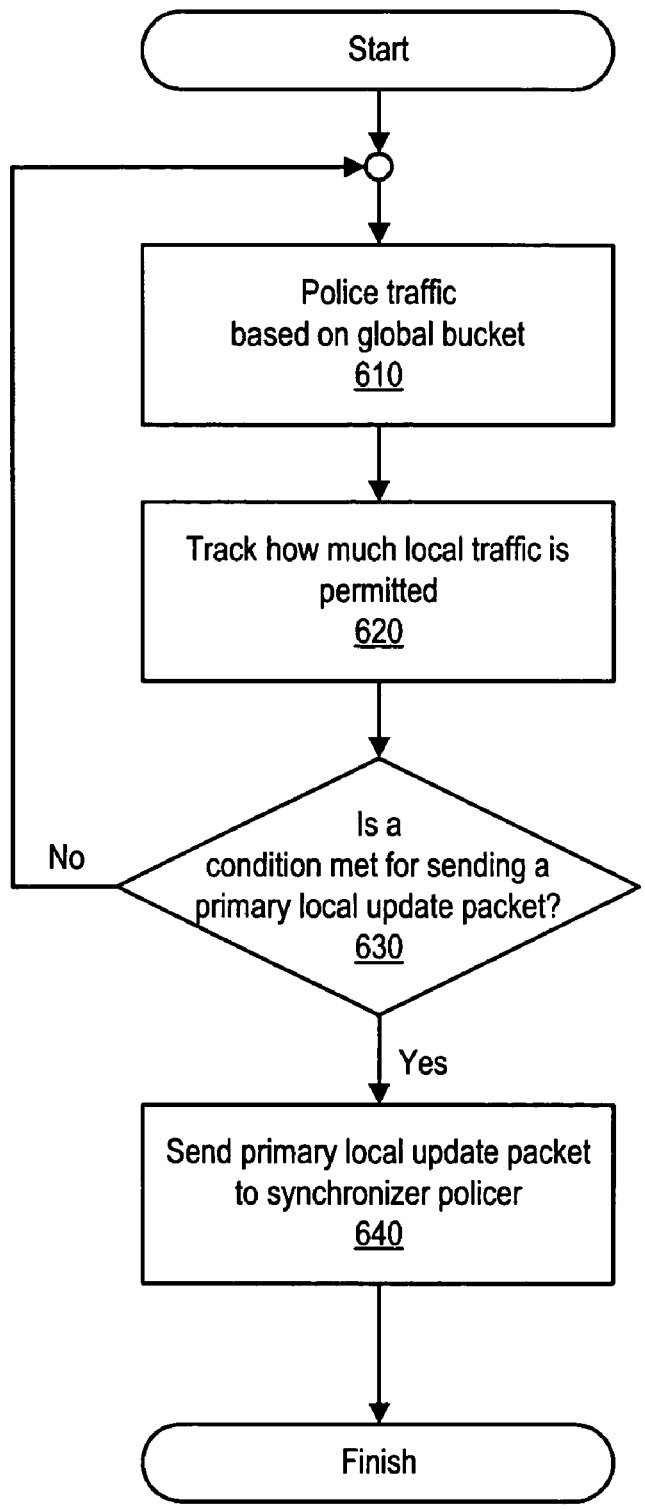
FIG. 6 is a flowchart showing an example of a method performed by a policer, according to one embodiment of the present invention.

FIG. 6 is a flowchart showing an example of a method performed by a policer when performing distributed policing. This method can be used to send primary local update packets to a synchronizer policer.

At 610, the policer performs policing based on a global bucket value. This value is indicative of the total amount of traffic that has been collectively permitted by all of the policers participating in distributed policing for a particular traffic class. As described above, performing policing involves determining whether to permit or police incoming packets, based on how close the global bucket is to being "full."

As the policer performs policing, the policer tracks how much traffic has been permitted locally, as indicated at 620. In other words, the policer tracks the amount of traffic (e.g., in bytes) that the policer has permitted. For example, in response to permitting a packet that includes 256 Kb, the policer can update a local traffic value (measured in Kb) by adding 256 to that value.

If a condition has been met for sending a primary local update packet, as determined at 630, the policer sends a primary local update packet to the synchronizer policer, as shown at 640. The primary local update packet includes a value that represents the amount of locally-permitted traffic (e.g., as maintained at 620). Additionally, the policer can reset (e.g., to a value indicating that no traffic has been permitted locally) the value that represents the amount of locally-permitted traffic in response to sending the primary local update packet. If the condition for sending the primary local update packet has not been meet, the policer continues to police traffic, as shown at 610-620.

A variety of different conditions for triggering sending of a primary local update packet can be specified. For example, in one embodiment, the condition can be time-based, so that the passage of a prespecified amount of time will trigger sending of a primary local update packet (if time-based conditions are used, secondary local update packets may or may not be used). In another embodiment, the condition is based on the amount of locally permitted traffic. If the amount of locally permitted traffic exceeds a threshold amount, the condition is met.

The method of FIG. 6 can be repeated. For example, after sending a primary local update packet to the synchronizer policer, the policer can continue to police traffic (620), track locally permitted traffic (630), check whether a condition for sending primary local update packets (630) is met, and send additional primary local update packets (640). Furthermore, other embodiments can include other functions instead of and/or in addition to those shown in FIG. 6.

Figure 7:
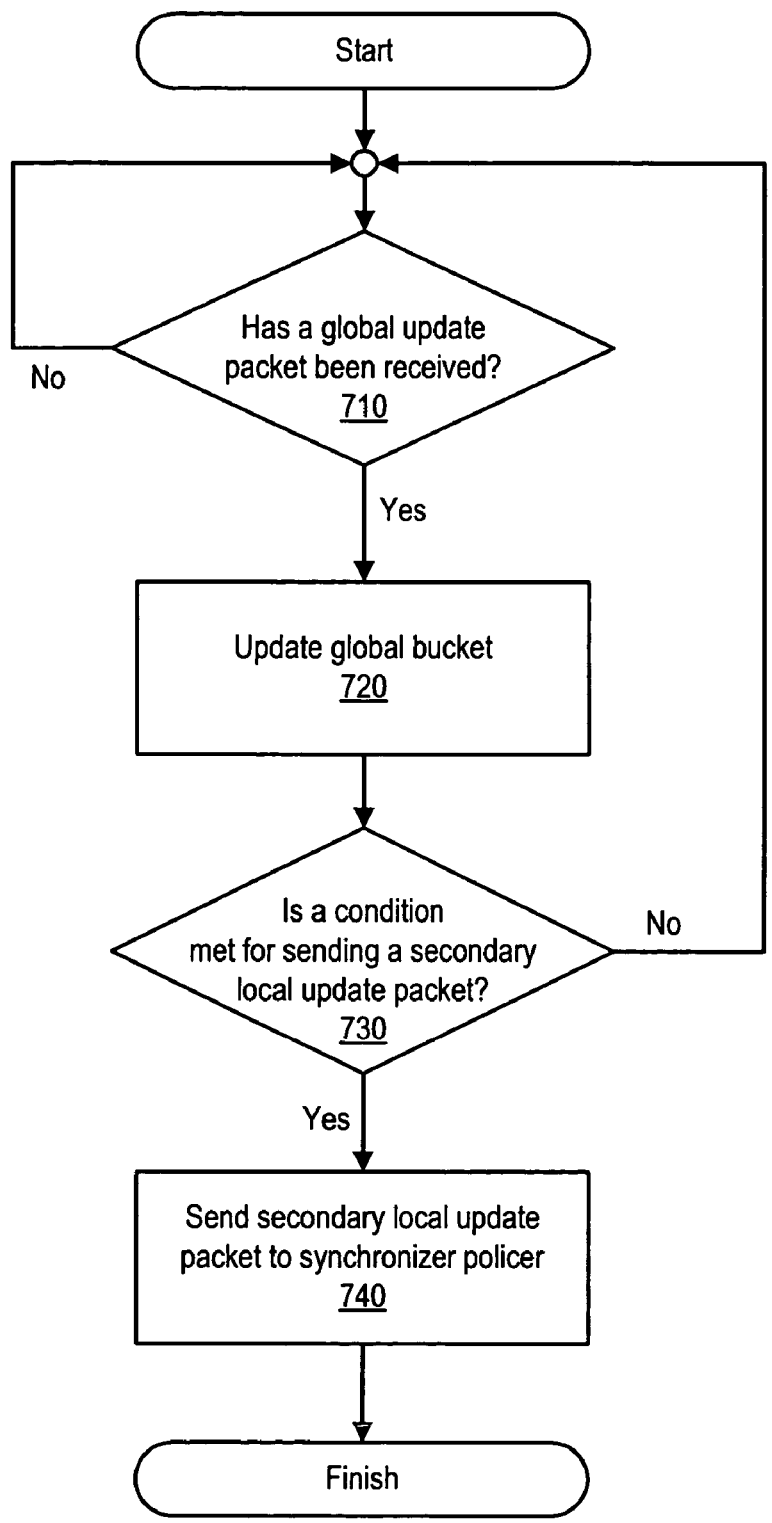
FIG. 7 is a flowchart showing an example of another method performed by a policer, according to one embodiment of the present invention.

FIG. 7 is a flowchart showing an example of another method performed by a policer. This method can be used to send a secondary local update packet. Secondary local update packets differ from primary local update packets (described above in the context of FIG. 6) in that primary local update packets are not send in response to receipt of a global update packet, but secondary local update packets are sent in response to receipt of a global update packet.

If a global update packet has been received by the policer, as determined at 710, the policer updates the global bucket value. For example, in one embodiment, the policer extracts a new global bucket value from the global update packet, and overwrites a local global bucket value with the new value extracted from the global update packet.

Additionally, if a condition for sending a secondary local update packet has been met, as determined at 730, the policer sends a secondary local update packet to the synchronizer policer, as shown at 740. Like the primary local update packet discussed above in relation to FIG. 6, the secondary local update packet includes a measure of traffic that has been permitted by the policer.

In some embodiments, the condition for sending the secondary local update packet is met any time a global update packet is received (in such an embodiment, function 730 can be combined with function 710). In other embodiments, this condition is met when the amount of locally-permitted traffic exceeds a threshold amount or the effective bucket exceeds the burst and when a global update packet has been received.

Like the method of FIG. 6, the method of FIG. 7 can be repeated. For example, after sending a secondary local update packet, a policer can continue to detect reception of global update packets (710), update a global bucket variable (720), determine whether a condition for sending a secondary local update packet has been met (730), and send additional secondary local update packets (740). Furthermore, other embodiments can include other functions instead of and/or in addition to those shown in FIG. 7.

While the above description has included examples that use a leaky bucket algorithm to perform distributed policing, it is noted that other distributed policing algorithms can be implemented in systems that employ synchronizer policers and/or secondary local update packets. For example, in one embodiment, a token bucket algorithm can be used as the distributed policing algorithm.

Figure 8:
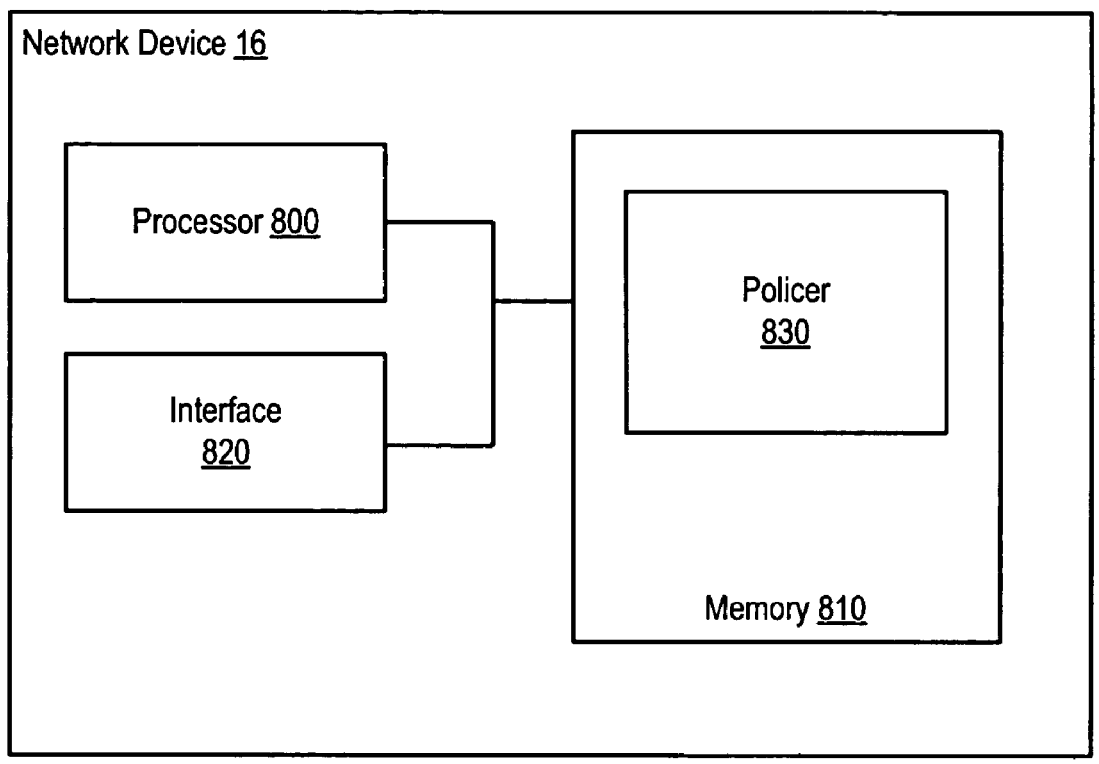
FIG. 8 is a block diagram of a network device, which illustrates how a policer can be implemented in software in some embodiments of the present invention.

FIG. 8 is a block diagram of a network device 16 (e.g., network device 16 of FIG. 2), which illustrates how a policer can be implemented in software. As illustrated, network device 16 includes one or more processors 800 (e.g., microprocessors, PLDs (Programmable Logic Devices), or ASICs (Application Specific Integrated Circuits)) configured to execute program instructions stored in memory 810. Memory 810 can include various types of RAM (Random Access Memory), ROM (Read Only Memory), Flash memory, MEMS (Micro Electro-Mechanical Systems) memory, and the like. Network device 16 also includes one or more interfaces 820 (e.g., one or more hardware ports or other network interfaces that can be linked to other network devices, hosts, servers, or the like). Processor 800, interface 820, and memory 810 are coupled to send and receive data and control signals by one or more buses or other interconnects.

In this example, program instructions executable to implement a policer 830 (e.g., a policer 300 and/or a synchronizer policer 400, as shown in FIGS. 3 and 4 respectively) are stored in memory 810. It is noted that the program instructions executable to implement policer 830 can be stored on various computer readable media such as a memory (e.g., RAM (Random Access Memory)). In some embodiments, such software is stored on a computer readable medium such as a CD (Compact Disc), DVD (Digital Versatile Disc), hard disk, optical disk, tape device, floppy disk, and the like). In order be executed, the software is loaded into memory from another computer readable medium. The instructions and/or data can also be transferred to a computing device for storage in memory via a network such as the Internet or upon a carrier medium. In some embodiments, a computer readable medium is a carrier medium such as a network and/or a wireless link upon which signals such as electrical, electromagnetic, or digital signals, on which the data and/or instructions implementing a policer are conveyed.

Although the present invention has been described with respect to specific embodiments thereof, various changes and modifications may be suggested to one skilled in the art. It is intended such changes and modifications fall within the scope of the appended claims.

What is claimed is:

1. A system comprising:
   a network device comprising a plurality of interfaces configured to be coupled to a network link; and
   a plurality of distributed algorithm participants, wherein
      the network device comprises at least one of the distributed algorithm participants,
      the distributed algorithm participants are coupled to communicate with each other,
      each of the distributed algorithm participants is configured to implement a distributed algorithm,
      each of the distributed algorithm participants maintains a shared variable in order to implement the distributed algorithm,
      the distributed algorithm participants comprise a synchronizer participant and a non-synchronizer participant,
      the synchronizer participant is configured to calculate a new value of the shared variable and to communicate the new value to the non-synchronizer participant, and
      the non-synchronizer participant comprises:
         a local update packet module; and
         a global update packet module coupled to the local update packet module, wherein the global update packet module is configured to receive the new value of the shared variable and update a local copy of the shared variable to equal the new value of the shared variable.

2. The system of claim 1, wherein
the local update packet module is configured to send a local update packet to the synchronizer participant, in response to the non-synchronizer participant receiving the new value of the shared variable, and
the local update packet identifies an adjustment to the shared variable.

3. The system of claim 2, wherein
the distributed algorithm is a distributed policing algorithm, and
the shared variable is a global bucket.

4. A system comprising:
a network device comprising a plurality of interfaces configured to be coupled to a network link; and
a plurality of policers, wherein
the network device comprises at least one of the policers,
the polices comprise a synchronizer policer and a non-synchronizer policer,
the policers are configured to perform distributed policing based on a global bucket variable,
the synchronizer policer is configured to calculate a new value of the global bucket variable and to send the new value to the non-syhchronizer policer, and
the non-synchronizer policer comprises:
a local update packet module; and
a global update packet module coupled to the local update packet module, wherein the global update packet module is configured to receive the new value of the global bucket variable and update a local copy of the global bucket variable to equal the new value of the global bucket variable.

5. The system of claim 4, wherein
the synchronizer policer is configured to calculate the new value of the global bucket variable based on a local traffic value received from one of the policers.

6. The system of claim 5, wherein
the local update packet module is configured to send a local update packet to the synchronizer policer, in response to the non-synchronizer policer receiving the new value of the global bucket variable, and
the local update packet comprises a measure of traffic permitted by the non-synchronizer policer.

7. The system of claim 6, wherein
the local update packet module is configured to send the local update packet to the synchronizer policer in response to the non-synchronizer policer both receiving the new value and a measure of locally permitted traffic exceeding a threshold value.

8. The system of claim 5, wherein
the synchronizer policer is configured to send the new value of the global bucket variable to a new policer, in response to detecting that the new policer has joined the plurality of policers, and
both the synchronizer policer and the new policer store an identical global bucket value subsequent to the new policer receiving the new value of the global bucket variable.

9. A system comprising:
a network device comprising a plurality of interfaces configured to be coupled to a network link and a policer, the policer comprising:
a first local update packet module; and
a global bucket update module coupled to the first local update packet module,
wherein
the first local update packet module is configured to send a first local update packet, the first local update packet comprising a measure of traffic permitted by the policer,
a global update packet received by the policer comprises a new value of a global bucket, and
the global bucket update module is configured to update a local copy of the global bucket to equal the new value of the global bucket included in the global update packet.

10. The system of claim 9, wherein
the policer further comprises a second local update packet module, and
the second local update packet module is configured to send a second local update packet in response to reception of the global update packet.

11. The system of claim 10, wherein
the policer sends The first local update packet to a synchronizer policer.

12. The system of claim 10, wherein
the policer is configured to send the secondary local update packet, in response to both receiving the global update packet and determining that:
an effective bucket at the policer exceeds a burst.

13. A method comprising:
receiving a global update packet comprising a new value of a global bucket at a network device, wherein the network device comprises a plurality of interfaces configured to be coupled to a link, and
the global bucket is used to police traffic in a network, and updating the global bucket to equal the new value included in the global update packet,
wherein
the global bucket is a local copy of a global bucket variable maintained by a first policer,
a second local copy of the global bucket variable is maintained by a second policer, and
subsequent to the updating the global bucket, the value of the local copy of the global bucket variable equals the value of the second local copy of the global bucket variable.

14. The method of claim 13, wherein
prior to the receiving the global update packet, a value of the local copy of the global bucket variable differs from a value of the second local copy of the global bucket variable.

15. The method of claim 13, further comprising:
sending a first local update packer to a synchronizer policer, wherein
the first local update packet comprises a value identifying an amount of traffic permitted by a single policer.

16. The method of claim 15, wherein the sending the first local update packet comprises:
sending the first local update packet in response to the value identifying the amount of traffic permitted by the single policer exceeding a threshold value.

17. The method of claim 15, further comprising:
sending a secondary local update packet, in response to receiving the global update packet.

18. The method of claim 17, wherein the sending the secondary local update packet comprises:
sending the secondary local update packet, in response to both receiving the global update packet and determining that an effective bucket value exceeds a burst.

19. A system comprising:
first network interface means for sending, on a network, a first local update packet, wherein the first local update packet comprises a measure of traffic permitted by a policer; and
second network interface means, coupled to the first means, for receiving, a global update packet comprising a new value of a global bucket, wherein the global bucket is used to police traffic in the network; and
third means for updating the global bucket to equal the new value included in the global update packet, wherein the global bucket is a local copy of a global bucket variable maintained by a first policer.

* * * * *

UNITED STATES PATENT AND TRADEMARK OFFICE
CERTIFICATE OF CORRECTION

PATENT NO.       : 7,636,304 B2                                    Page 1 of 1
APPLICATION NO.  : 11/093882
DATED            : December 22, 2009
INVENTOR(S)      : Ketan A. Padwekar It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1026 days.

Signed and Sealed this

Twenty-first Day of December, 2010

David J. Kappos
*Director of the United States Patent and Trademark Office*